United States Patent
Anderson

(10) Patent No.: US 8,801,394 B2
(45) Date of Patent: Aug. 12, 2014

(54) SYSTEM AND METHOD FOR DRIVING A PUMP

(75) Inventor: Kevin D. Anderson, Houston, TX (US)

(73) Assignee: Solar Turbines Inc., San Diego, CA (US)

( * ) Notice: Subject to any disclaimer, the term of this patent is extended or adjusted under 35 U.S.C. 154(b) by 325 days.

(21) Appl. No.: 13/172,439

(22) Filed: Jun. 29, 2011

(65) Prior Publication Data

US 2013/0004337 A1 Jan. 3, 2013

(51) Int. Cl.
*F04B 49/02* (2006.01)

(52) U.S. Cl.
USPC .......................................... 417/223; 417/316

(58) Field of Classification Search
USPC .......... 417/15, 53, 223, 316, 319, 423.6, 364, 417/63; 477/52, 53, 54, 168, 169; 74/730.1, 74/731.1, 732.1, 733.1
See application file for complete search history.

(56) References Cited

U.S. PATENT DOCUMENTS

| | | | |
|---|---|---|---|
| 3,886,729 A | 6/1975 | Amann et al. | |
| 4,008,567 A | 2/1977 | Hirsch | |
| 4,132,064 A | 1/1979 | Kumm | |
| 4,173,152 A * | 11/1979 | Kondo et al. | 476/9 |
| 4,686,822 A | 8/1987 | Frutschi | |
| 5,092,824 A | 3/1992 | Connett | |
| 6,463,740 B1 * | 10/2002 | Schmidt et al. | 60/772 |
| 7,207,785 B2 * | 4/2007 | Dalton et al. | 417/269 |
| 7,422,543 B2 | 9/2008 | Ransbarger et al. | |
| 7,635,253 B2 * | 12/2009 | Garcia-Ortiz | 417/44.2 |
| 2004/0033144 A1 * | 2/2004 | Rush | 417/223 |
| 2011/0048119 A1 | 3/2011 | Hansen et al. | |

FOREIGN PATENT DOCUMENTS

JP 10-317990 A 12/1998

* cited by examiner

*Primary Examiner* — Bryan Lettman
(74) *Attorney, Agent, or Firm* — Finnegan, Henderson, Farabow, Garrett & Dunner LLP

(57) ABSTRACT

A system for driving a pump includes a gas turbine engine having an output shaft, and a torque converter including an input shaft coupled to the output shaft of the gas turbine engine and an output shaft configured to be coupled to an input shaft of a pump. The system further includes a controller coupled to the torque converter, wherein the controller is configured to receive a signal indicative of a pressure at at least one of a pump inlet and a pump outlet, and control a speed of the output shaft of the torque converter based on the signal indicative of pressure.

19 Claims, 5 Drawing Sheets

SYSTEM AND METHOD FOR DRIVING A PUMP

TECHNICAL FIELD

The present disclosure relates to a system and method for driving a pump, and more particularly, to a system and method for driving a pump via a gas turbine engine coupled to a torque converter.

BACKGROUND

It is possible to couple a gas turbine engine to a pump and thereby supply power to the pump to pump fluid. However, gas turbine engines typically operate at much higher rotational speeds than pumps. For example, some gas turbine engines may operate efficiently at about 15,000-16,000 revolutions per minute (rpm), while some pumps may operate at speeds of up to about 2,000 rpm. It is possible to couple the gas turbine engine to a pump via a reduction gear assembly, so that the operating speed of the gas turbine engine is compatible with the operating speed of the pump.

However, in some applications it may be desirable to operate a pump at varying speeds based on conditions of the fluid being pumped. For example, it may be desirable to operate at a speed much lower than the normal operating speed of the pump. In such situations, a gas turbine engine may be unsuitable for supplying power to the pump because it may operate efficiently in only a relatively narrow range of operating speeds compared to the pump.

A system employing a torque converter and a synchronizing motor to start up a large rotational driver/load combination is disclosed in U.S. Pat. No. 7,422,543 B2 to Ransbarger et al. ("the '543 patent"). In particular, the '543 patent discloses a torque converter employed to increase the rotational speed of a load to a maximum speed permitted by the torque converter. The synchronizing motor is then employed to further increase the rotational speed of the load to substantially match the rotational speed of the driver.

Although the '543 patent discloses use of a torque converter to couple a gas turbine engine to a load, the system disclosed in the '543 patent may suffer from a number of potential drawbacks due to, for example, insufficient control of the output of the torque converter. Thus, it may be desirable to mitigate or overcome these potential drawbacks to improve control of the output of the torque converter.

SUMMARY

In one aspect, the present disclosure includes a system for driving a pump configured to receive fluid at a pump inlet and discharge the fluid at a pump outlet. The system includes a gas turbine engine having an output shaft and a torque converter including an input shaft coupled to the output shaft of the gas turbine engine and an output shaft configured to be coupled to an input shaft of a pump. The system further includes a controller coupled to the torque converter, wherein the controller is configured to receive a signal indicative of a pressure at at least one of the pump inlet and the pump outlet, and control a speed of the output shaft of the torque converter based on the signal indicative of pressure.

According to a further aspect, the present disclosure includes a system for pumping fluid. The system includes a gas turbine engine having an output shaft and a pump configured to pump fluid. The pump includes an inlet, an outlet, and an input shaft. The system further includes a torque converter including an input shaft coupled to the output shaft of the gas turbine engine and an output shaft coupled to the input shaft of the pump. The system also includes a controller coupled to the torque converter, wherein the controller is configured to receive a signal indicative of a pressure at at least one of the pump inlet and the pump outlet, and control a speed of the output shaft of the torque converter based on the signal indicative of pressure.

According to another aspect, the disclosure includes a method for controlling output of a pump coupled to a gas turbine engine via a torque converter. The method includes operating the gas turbine engine at a relatively constant speed, and controlling a speed of an output shaft of the torque converter based on a signal indicative of pressure at at least one of an inlet of the pump and an outlet of the pump.

DETAILED DESCRIPTION

Figure 1:
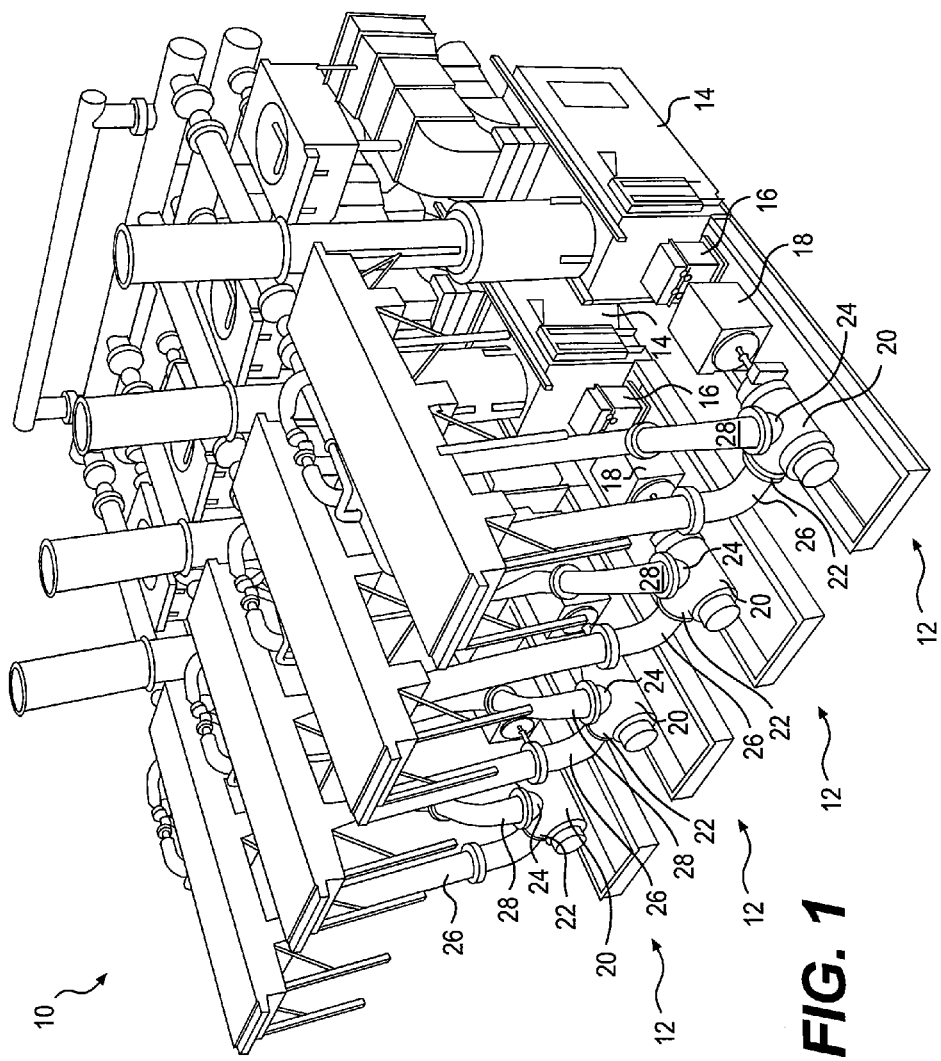
FIG. 1 is a schematic perspective view of an exemplary embodiment of a system for pumping fluid.
Figure 2:
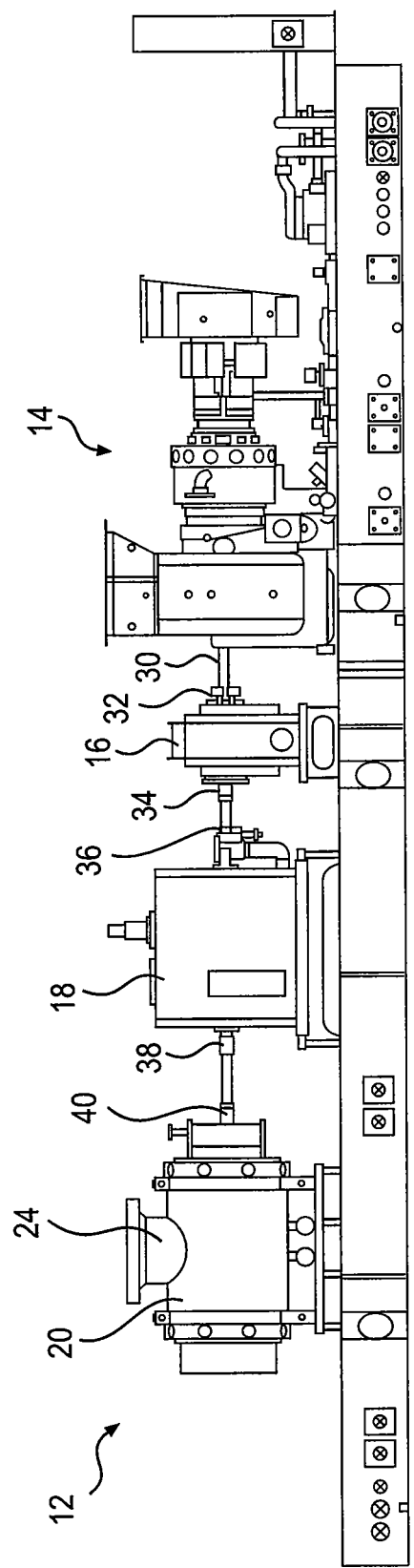
FIG. 2 is a schematic, elevation view of a portion of a system for pumping fluid.

FIG. 1 shows an exemplary embodiment of a system 10 for pumping fluid. As shown in FIG. 1, exemplary system 10 includes four pump sets 12. Although the exemplary embodiment shown includes four pump sets 12, fewer or more pump sets 12 may be employed in system 10, for example, to meet the desired pumping capability of system 10. As shown in FIGS. 1 and 2, each of exemplary pump sets 12 includes a gas turbine engine 14 coupled to an input of a respective transmission 16. Transmission 16 may include a reduction gear assembly. An output of each respective transmission 16 is coupled to an input of a respective torque converter 18, and an output of each respective torque converter 18 is coupled to an input of a pump 20. Torque converter 18 may be a variable speed torque converter, which may be controlled to vary the ratio of input speed-to-output speed of torque converter 18 between 0 and 1:1. Pump 20 may be a positive displacement pump, for example, a twin-screw, positive displacement pump.

Each pump 20 includes a fluid inlet 22 and a fluid outlet 24. Fluid inlet 22 receives fluid via one or more pipes 26 from an upstream fluid source (not shown) of system 10, and system 10 is configured to pump the fluid received from the upstream fluid source via fluid outlet 24 and one or more pipes 28 to a downstream fluid recipient (not shown). For example, the upstream fluid source may be an offshore oil platform, and the downstream fluid recipient may be an on-shore terminal for receiving crude oil extracted by the offshore oil platform. Thus, the fluid being pumped by system 10 may include crude oil, which, under certain conditions, may be highly viscous and difficult to pump. For example, if pumping of the crude oil from the upstream fluid source has been suspended for a period of time due, for example, to maintenance- and/or weather-related reasons, crude oil in the pipes 26 between the upstream fluid source and system 10 may become relatively more viscous and difficult to pump. This may result from, for example, cooling of the crude oil as it remains stationary in the pipes 26 for an extended period of time. As a result, when pumping of the crude oil resumes following a period of suspension, it may be desirable to begin operation of system 10 by operating the pumps 20 well below a normal, steady-state pumping speed.

Figure 3:
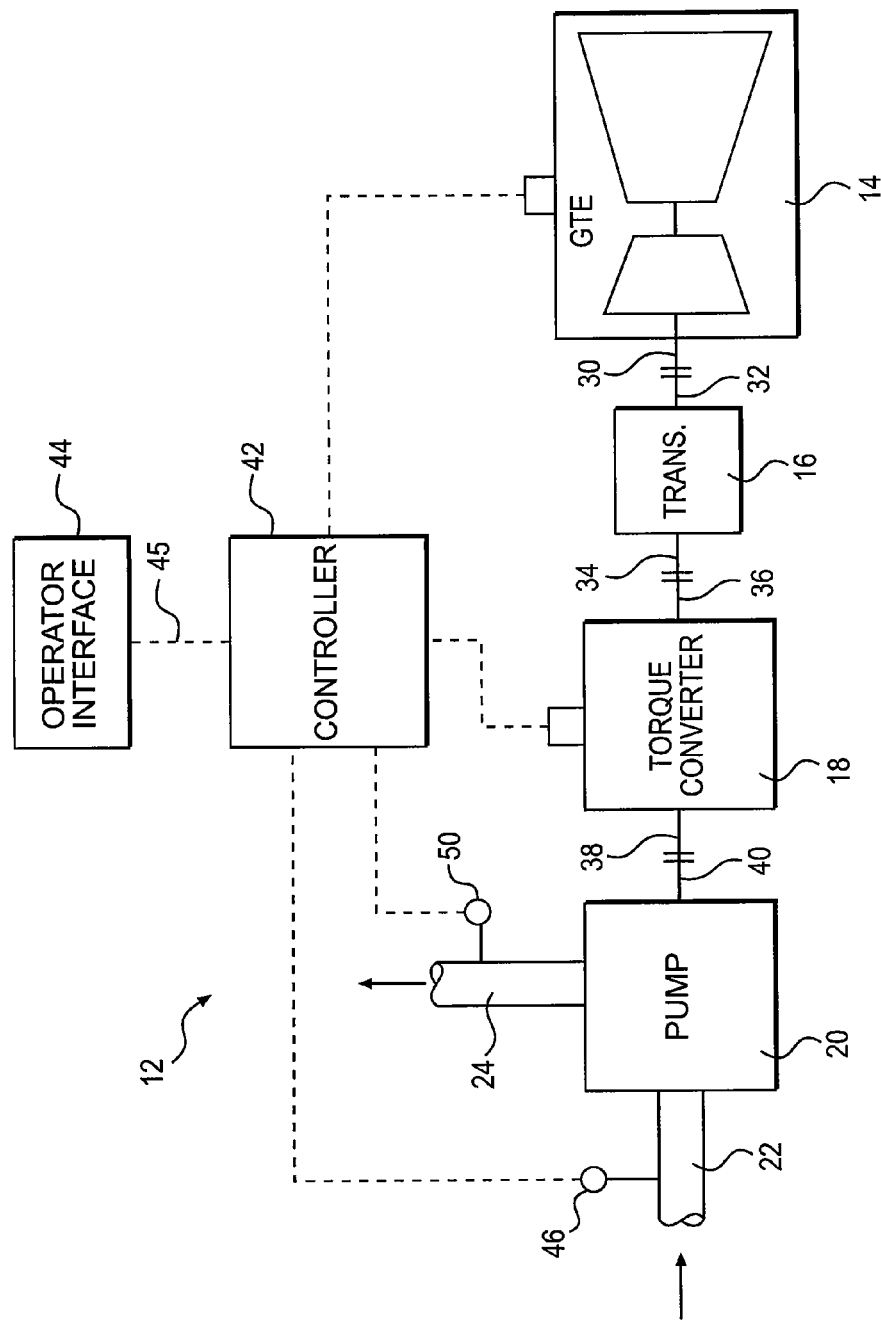
FIG. 3 is a block diagram of an exemplary embodiment of a system for pumping fluid.

As shown in FIG. 3, exemplary system 10 includes gas turbine engine 14, which includes an output shaft 30 coupled to an input shaft 32 of transmission 16. An output shaft 34 of transmission 16 is coupled to an input shaft 36 of torque converter 18, and an output shaft 38 of torque converter 18 is coupled to an input shaft 40 of pump 20.

The exemplary embodiment shown in FIG. 3 includes a controller 42 configured to control operation of system 10. For example, controller 42 may be coupled to gas turbine engine 14 and may be configured to control operation of gas turbine engine 14, including control of the power output and/or speed of output shaft 30. Exemplary controller 42 may also be coupled to torque converter 18 and may be configured to control operation of torque converter 18, including control of a ratio of the speed of input shaft 36-to-the speed of output shaft 38 of torque converter 18, as explained in more detail below.

Controller 42 may include one or more processors, microprocessors, central processing units, on-board computers, electronic control modules, and/or any other computing and control devices known to those skilled in the art. Controller 42 may be configured run one or more software programs or applications stored in a memory location, read from a computer-readable medium, and/or accessed from an external device operatively coupled to controller 42 by any suitable communications network.

Exemplary system 10 shown in FIG. 3 also includes an operator interface 44 configured to facilitate control of system 10 by an operator, either present at system 10 or located remotely from system 10. Operator interface 44 is coupled to controller 42 via a physical communication link and/or a wireless communication link 45. Operator interface 44 may be integrated with controller 42 or may be separate from controller 42.

Controller 42 may be configured to operate gas turbine engine 14 at a target speed of about 15,000 to about 16,000 rpm. This target speed may correspond to an operating speed that results in efficient operation of gas turbine engine 14. According to some embodiments, controller 42 may be configured to operate gas turbine engine 14 at a relatively constant speed that may correspond to a speed within a predetermined range of the target speed, for example, within about 100 to 500 rpm of the target speed of gas turbine engine 14.

Exemplary torque converter 18 is a variable speed torque converter, which is configured to provide an ability to vary a ratio of speed of input shaft 36-to-the speed of output shaft 38 of torque converter 18. For example, torque converter 18 may be controlled such that the ratio of the rotational speed of input shaft 36 to the rotational speed of output shaft 38 varies between 0 and 1:1. By varying the ratio, the speed of pump 20 may be varied to provide a desired flow rate of the fluid being pumped that is substantially independent of the speed of input shaft 36 of torque converter 18 and the speed of gas turbine engine 14.

In the exemplary embodiment shown in FIG. 3, system 10 includes a sensor 46 configured to provide an indication of the pressure at inlet 22 of pump 20 associated with pipe 26 providing flow communication with the upstream fluid source. System 10 also may also include a sensor 50 configured to provide an indication of the pressure at outlet 24 of pump 20 associated with pipe 28 providing flow communication with the downstream fluid recipient. Sensors 46 and 50 may include pressure sensors and/or flow sensors. Sensors 46 and 50 are coupled to controller 42, such that they provide signals indicative of pressure at inlet 22 and outlet 24 of pump 20 to controller 42.

According to some embodiments, controller 42 may be configured to operate gas turbine engine 14 at a relatively constant speed while varying the output of pump 20 by varying the input-to-output ratio of torque converter 18. For example, controller 42 may receive a signal from sensor 46 indicative of the fluid pressure at inlet 22 of pump 20 and control the speed of output shaft 38 of torque converter 18 based on the signal. For example, controller 42 may control torque converter 18 such that the speed of output shaft 38 of torque converter 18 is increased when the signal from sensor 46 indicative of pressure at inlet 22 of pump 20 increases above a target input pressure. Conversely, controller 42 may control torque converter 18 such that the speed of output shaft 38 of torque converter 18 is decreased when the signal from sensor 46 indicative of pressure at inlet 24 of pump 20 decreases below a target input pressure. In this exemplary manner, the output of pump 20 may be controlled without significantly varying the speed of gas turbine engine 14.

According to some embodiments, controller 42 may receive a signal from sensor 50 indicative of the fluid pressure at outlet 24 of pump 20 and control the speed of output shaft 38 of torque converter 18 based on the signal. For example, controller 42 may control torque converter 18 such that the speed of output shaft 38 of torque converter 18 is decreased when the signal from sensor 50 indicative of pressure at outlet 24 of pump 20 is greater than a predetermined maximum pressure. This may prevent an undesirably high pressure from occurring downstream of pump 20.

According to some embodiments, the output of pump 20 may be controlled manually by an operator. For example, an operator may use operator interface 44 to select an output speed for gas turbine engine 14 and/or an output for pump 20, for example, based at least in part on the pressure at inlet 22 and/or outlet 24 of pump 20, in a manner similar to the process described above. Controller 42 may be configured to receive signals from operator interface 44 via link 45 and operate gas turbine engine 14 and torque converter 18 to provide a desired output of pump 20.

Figure 4:
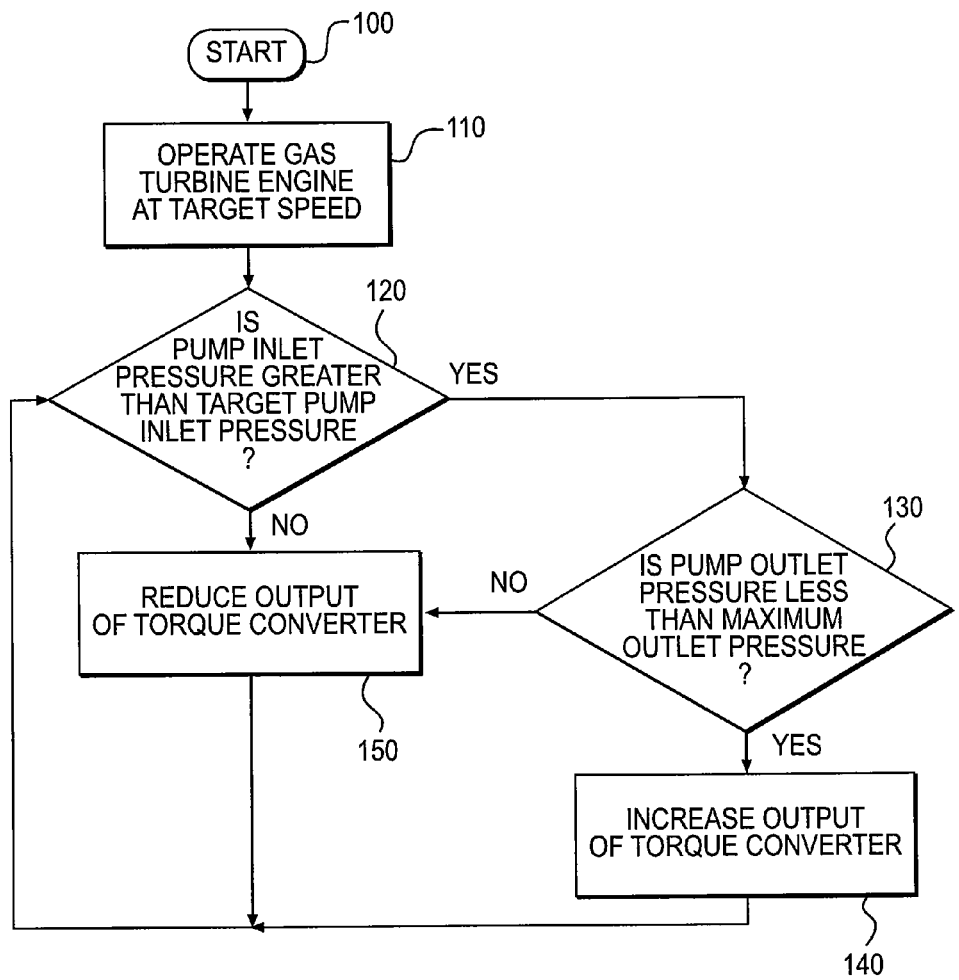
FIG. 4 is a flow diagram of an exemplary embodiment of a method for pumping fluid.

FIG. 4 shows a flow diagram of an exemplary embodiment of a method for pumping fluid. The exemplary method begins at 100 and gas turbine engine 14 is operated at a target speed at step 110. Thereafter, at step 120, if fluid pressure at inlet 22 of pump 20 is greater than a target inlet pressure, and at step 130, if the fluid pressure at outlet 24 of pump 20 is below a predetermined maximum pressure, then at step 140, the speed of output shaft 38 of torque converter 18 is increased to increase the output of pump 20. On the other hand, if at step 120, the fluid pressure at inlet 22 of pump 20 is below the target inlet pressure, then at step 150, the speed of output shaft 38 of torque converter 18 is reduced to reduce the output of pump 20. Further, if at step 130, the fluid pressure at outlet 24 of pump 20 equals or exceeds the predetermined maximum pressure, at step 150 the speed of output shaft 38 of torque converter 18 is reduced to reduce the output of pump 20. This exemplary method may be performed manually by an operator via operator interface 44 or automatically via controller 42.

Figure 5:
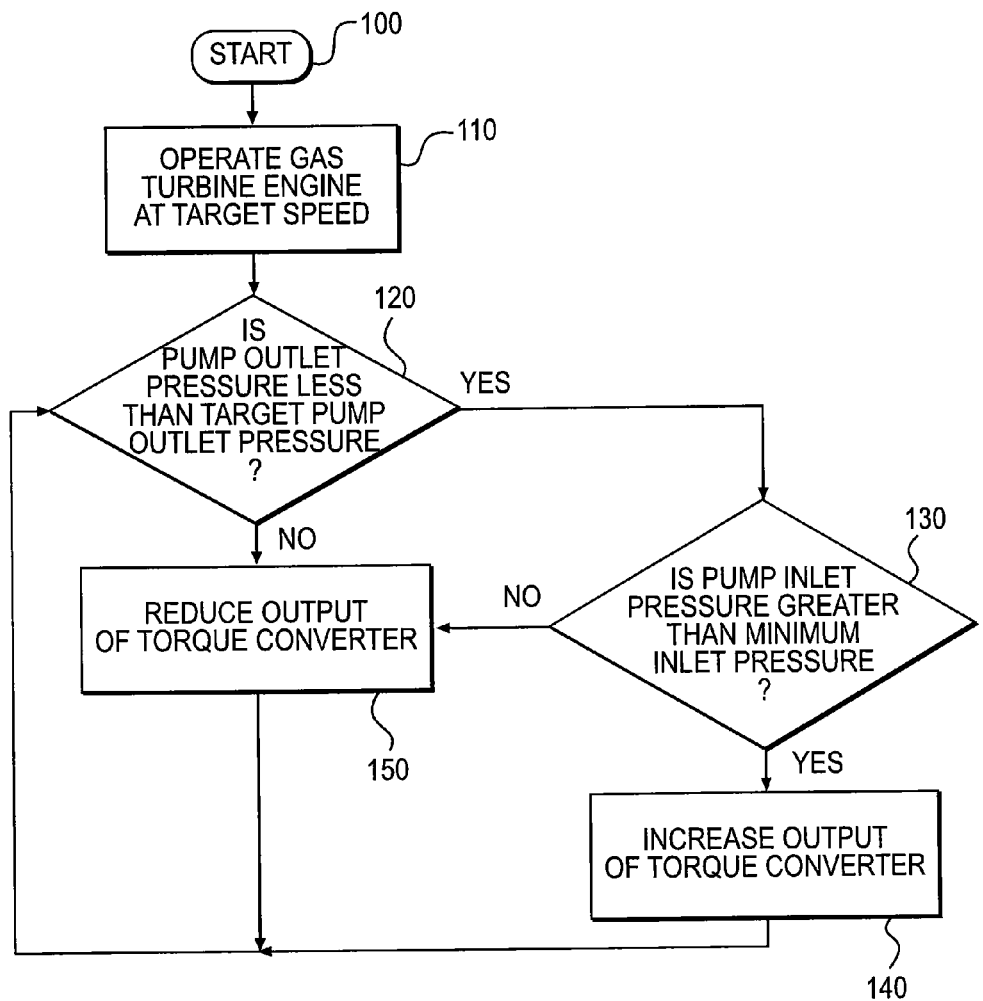
FIG. 5 is a flow diagram of another exemplary embodiment of a method for pumping fluid.

FIG. 5 shows a flow diagram of another exemplary embodiment of a method for pumping fluid. The exemplary method begins at 100 and gas turbine engine 14 is operated at a target speed at step 110. Thereafter, at step 120, if fluid pressure at outlet 24 of pump 20 is less than a target outlet pressure, and at step 130, if the fluid pressure at inlet 22 of pump 20 is greater than a predetermined minimum pressure, then at step 140, the speed of output shaft 38 of torque converter 18 is increased to increase the output of pump 20. On the other hand, if at step 120, the fluid pressure at outlet 24 of pump 20 is greater than the target outlet pressure, then at step 150, the speed of output shaft 38 of torque converter 18 is reduced to reduce the output of pump 20. Further, if at step 130, the fluid pressure at inlet 22 of pump 20 is less than the predetermined minimum pressure, at step 150 the speed of output shaft 38 of torque converter 18 is reduced to reduce the output of pump 20. This exemplary method may be performed manually by an operator via operator interface 44 or automatically via controller 42.

INDUSTRIAL APPLICABILITY

Exemplary system 10 may be used for pumping fluid. For example, the exemplary system 10 shown in FIG. 1 includes four pump sets 12, each including a gas turbine engine 14 coupled to a transmission 16, which, in turn, is coupled to a torque converter 18 coupled to a pump 20. Pump 20 receives fluid via one or more pipes 26 from an upstream fluid source of system 10, and system 10 is configured to pump the fluid received from the upstream fluid source via one or more pipes 28 to a downstream fluid recipient.

For example, the upstream fluid source may be an offshore oil platform, and the downstream fluid recipient may be a on-shore terminal for receiving crude oil extracted by the offshore oil platform. Thus, the fluid being pumped by system 10 may include crude oil, which under certain conditions may be highly viscous and difficult to pump. For example, if pumping of the crude oil from the upstream fluid source has been suspended for a period of time due, it may be desirable to begin operation of system 10 by operating the pumps 20 well below a normal, steady-state output of pumps 20, and thereafter, incrementally or gradually increasing the output of pumps 20 until they reach the normal, steady state output.

Exemplary torque converter 18 facilitates varying the output of pump 20 without significantly varying the speed of gas turbine engine 14. This may permit gas turbine engine 14 to operate at a range of speeds resulting in greater efficiency and/or reduced undesirable emissions.

In the exemplary embodiment shown, upon start-up of system 10, for example, if the crude oil being pumped is viscous and difficult to pump, it may take several days before system 10 is able to pump the crude oil at the normal, steady-state flow rate. This may result in part from the upstream source supplying the crude oil at a much lower flow rate than normal. Thus, it may be desirable upon start-up of pumping the crude oil by system 10 to begin pumping the oil at a relatively slow flow rate (e.g., about 50,000 barrels per day), and gradually or incrementally increasing the flow rate being pumped by system 10 to a normal, steady-state flow rate (e.g., about 600,000 to about 650,000 barrels per day).

For example, the flow rate may be incrementally increased by beginning the pumping by using only a single pump set 12 at first and setting the flow rate to a first flow rate (e.g., of about 50,000 barrels per day) and continuing to pump the crude oil at this first flow rate for a predetermined period of time, before increasing the flow rate by a predetermined amount to a second flow rate (e.g., 100,000 barrels per day). This incrementally-increasing approach may be continued until the first pump set 12 has reached its normal, steady-state flow rate (e.g., about 150,000 to about 160,000 barrels per day). Thereafter, pumping using a second pump set 12 may be started at the first flow rate, with the flow rate of the second pump set 12 being incrementally increased in a manner similar to the process described above for the first pump set 12. Thereafter, this incremental approach may be repeated using the remaining pump sets 12, until system 10 is operating at its normal, steady state pumping rate (e.g., about 600,000 to about 650,000 barrels/day).

In the example above, gas turbine engine 14 may operate at about 15,500 to about 16,000 rpm. Transmission 16 may include a reduction gear assembly resulting in output shaft 34 of transmission 16 operating at about 3,200 to about 3,300 rpm. Torque converter 18 may be a variable-speed torque converter configured to vary operation with an output shaft speed of about 500 to about 1,800 rpm. Pump 20 may be a positive displacement, twin-screw pump with a capacity of up to about 160,000 barrels per day, with input shaft 40 of pump 20 being driven at a speed of about 1,800 rpm by output shaft 38 of torque converter 18.

It will be apparent to those skilled in the art that various modifications and variations can be made to the exemplary disclosed systems and methods. Other embodiments will be apparent to those skilled in the art from consideration of the specification and practice of the exemplary disclosed embodiments. It is intended that the specification and examples be considered as exemplary only, with a true scope being indicated by the following claims and their equivalents.

What is claimed is:

1. A system for driving a pump configured to receive fluid at a pump inlet and discharge the fluid at a pump outlet, the system comprising:
   a gas turbine engine having an output shaft;
   a torque converter including an input shaft coupled to the output shaft of the gas turbine engine, and an output shaft configured to be coupled to an input shaft of the pump; and
   a controller coupled to the torque converter,
   wherein the controller is configured to:
      receive a signal indicative of a pressure at at least one of the pump inlet and the pump outlet,
      control a speed of the output shaft of the torque converter based on the signal indicative of pressure, and
      control the speed of the output shaft of the torque converter independent of a speed of the output shaft of the gas turbine engine.

2. The system of claim 1, wherein the controller is configured to increase the speed of the output shaft of the torque converter when a signal indicative of pressure at the pump inlet indicates an increase in pressure.

3. The system of claim 1, wherein the controller is configured to receive a signal indicative of pressure at the pump outlet, and the controller is configured to decrease the speed of the output shaft of the torque converter when the signal indicative of pressure at the pump outlet indicates a pressure that exceeds a predetermined pressure.

4. The system of claim 1, wherein the input shaft of the torque converter is coupled to the output shaft of the gas turbine engine via a transmission, the transmission including an input shaft coupled to the output shaft of the gas turbine engine and an output shaft coupled to the input shaft of the torque converter.

5. The system of claim 4, wherein the transmission includes a gear reduction assembly.

6. The system of claim 4, wherein the controller is configured to control the speed of the output shaft of the torque converter at a speed ranging from about 500 rpm to about 1,800 rpm.

7. A system for pumping fluid, the system comprising:
   a gas turbine engine having an output shaft;
   a pump configured to pump fluid, the pump including an inlet, an outlet, and an input shaft;

a torque converter including an input shaft coupled to the output shaft of the gas turbine engine and an output shaft coupled to the input shaft of the pump; and a controller coupled to the torque converter, wherein the controller is configured to:

receive a signal indicative of a pressure at at least one of the pump inlet and the pump outlet, control a speed of the output shaft of the torque converter based on the signal indicative of pressure, and control the speed of the output shaft of the torque converter independent of a speed of the output shaft of the gas turbine engine.

8. The system of claim 7, wherein the input shaft of the torque converter is coupled to the output shaft of the gas turbine engine via a transmission, the transmission including an input shaft coupled to the output shaft of the gas turbine engine and an output shaft coupled to the input shaft of the torque converter.

9. The system of claim 8, wherein the transmission includes a gear reduction assembly.

10. The system of claim 7, wherein the controller is configured control the speed of the output shaft of the torque converter at a speed ranging from about 500 rpm to about 1,800 rpm.

11. The system of claim 7, wherein the pump includes a positive displacement pump.

12. The system of claim 7, wherein the controller is configured to increase the speed of the output shaft of the torque converter when a signal indicative of pressure at the pump inlet indicates an increase in pressure.

13. The system of claim 7, wherein the controller is configured to receive a signal indicative of pressure at the pump outlet, and the controller is configured to decrease the speed of the output shaft of the torque converter when the signal indicative of pressure at the pump outlet indicates a pressure that exceeds a predetermined pressure.

14. A method for controlling output of a pump coupled to a gas turbine engine via a torque converter, the method comprising:

operating the gas turbine engine at a relatively constant speed;

controlling a speed of an output shaft of the torque converter based on a signal indicative of pressure at at least one of an inlet of the pump and an outlet of the pump; and controlling the speed of the output shaft of the torque converter independent of a speed of an output shaft of the gas turbine engine.

15. The method of claim 14, wherein controlling the speed of the output shaft of the torque converter includes gradually or incrementally increasing the speed of the output shaft of the torque converter as a signal indicative of pressure at the inlet of the pump increases.

16. The method of claim 14, wherein the controlling the speed of the output shaft of the torque converter includes reducing the speed of the output shaft of the torque converter if a signal indicative of pressure at an outlet of the pump exceeds a predetermined pressure.

17. The method of claim 14, wherein operating the gas turbine engine at a relatively constant speed includes operating the gas turbine engine at speed that corresponds to efficient operation of the gas turbine engine.

18. The method of claim 14, wherein controlling the speed of the output shaft of the torque converter is performed manually.

19. The method of claim 14, wherein controlling the speed of the output shaft of the torque converter is performed automatically via a controller.

* * * * *